United States Patent
Demirel et al.

(10) Patent No.: US 10,254,404 B2
(45) Date of Patent: Apr. 9, 2019

(54) 3D MEASURING MACHINE

(71) Applicant: HEXAGON TECHNOLOGY CENTER GMBH, Heerbrugg (CH)

(72) Inventors: Mehmet Demirel, Koblach (AT); Johan Stigwall, St. Gallen (CH); Pascal Jordil, Ecoteaux (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 390 days.

(21) Appl. No.: 15/205,875

(22) Filed: Jul. 8, 2016

(65) Prior Publication Data

US 2017/0010356 A1 Jan. 12, 2017

(30) Foreign Application Priority Data

Jul. 10, 2015 (EP) .................... 15176238

(51) Int. Cl.
*G01C 3/08* (2006.01)
*G01S 17/08* (2006.01)
*G01B 11/25* (2006.01)
*G01B 11/00* (2006.01)

(52) U.S. Cl.
CPC .............. *G01S 17/08* (2013.01); *G01B 11/00* (2013.01); *G01B 11/25* (2013.01)

(58) Field of Classification Search
CPC ......... G01B 11/00; G01B 11/25; G01S 17/08; G06T 7/514; G06T 7/521
USPC ...................................................... 356/3.01
See application file for complete search history.

(56) References Cited

U.S. PATENT DOCUMENTS

| | | | | |
|---|---|---|---|---|
| 6,421,114 B1* | 7/2002 | Miyazaki | .............. | G01B 11/25 250/201.2 |
| 7,034,272 B1* | 4/2006 | Leonard | ................ | G01B 11/25 250/208.1 |
| 9,273,946 B2 | 3/2016 | Siercks | | |
| 9,995,576 B2* | 6/2018 | Lee | .......................... | G01C 3/06 |
| 2015/0213606 A1* | 7/2015 | Akopyan | ............... | G01S 17/42 348/46 |

FOREIGN PATENT DOCUMENTS

| | | |
|---|---|---|
| CN | 104279954 A | 1/2015 |
| CN | 104730532 A | 6/2015 |
| EP | 0270935 A1 | 6/1998 |
| EP | 2 543 483 A1 | 1/2013 |
| WO | 02/29357 A2 | 4/2002 |

OTHER PUBLICATIONS

Partial European Search Report dated Mar. 11, 2016 as received in Application No. 15176238.2.

* cited by examiner

*Primary Examiner* — Mark Hellner
(74) *Attorney, Agent, or Firm* — Maschoff Brennan

(57) ABSTRACT

Measuring machine and method for acquisition of small scale 3D information using a camera and a laser distance measuring unit with a laser source emitting a laser light beam having an oval or line-like cross-section onto a surface of an object to be gauged so that it is reflected to a detecting portion of a laser light sensor, and provide distance information based on the reflected laser light of said oval or line-like laser beam detected by the detecting portion.

19 Claims, 7 Drawing Sheets

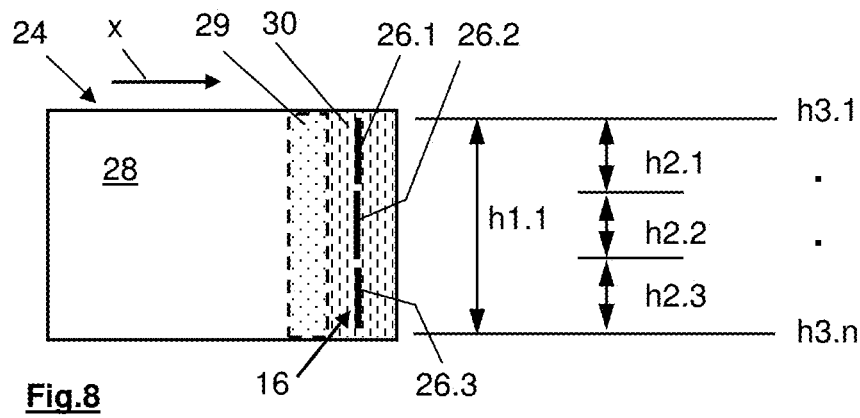
Fig. 8
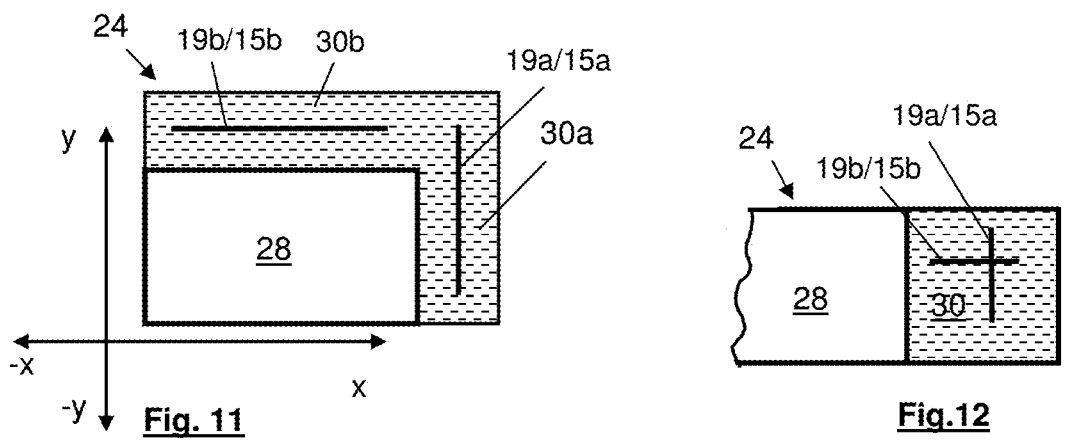
Fig. 11
Fig. 12
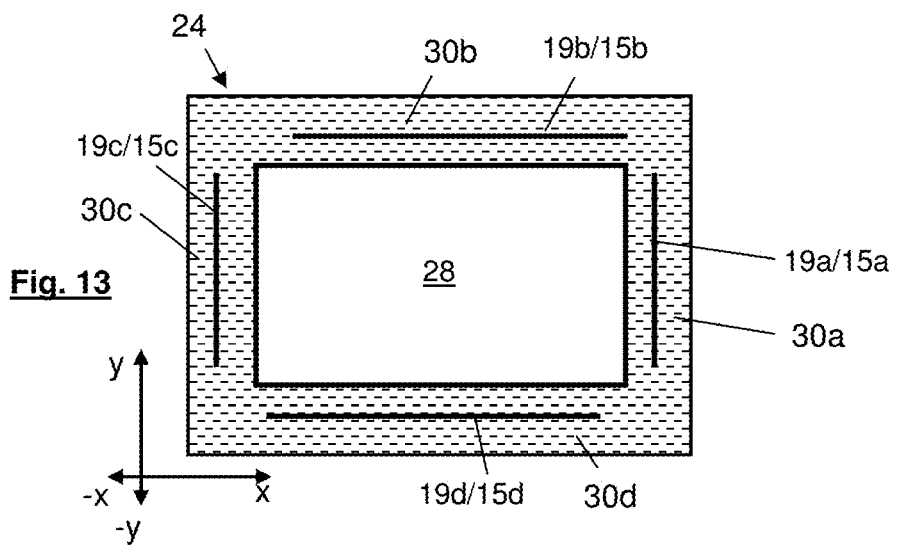
Fig. 13

3D MEASURING MACHINE

FIELD

The present invention relates to an image based 3D measuring machine, also called vision measuring machine, for acquisition of small scale 3D information, e.g. in order to measure the dimensions of workpieces in purpose of quality control, wherein small scale means a range of millimeter, micrometer, nanometer. For this purpose images are used taken by a camera integrated in the measuring machine. A workpiece or object to be gauged is usually placed on a cross-table of the measuring machine, allowing controlled movements in x- and y-direction. The camera for taking the images is mounted on a vertical moving axis of the measuring machine allowing controlled movements in z-direction. Other embodiments provided a camera mounted movable in x-, y- and z-direction over a stationary fixed workpiece. In both cases each acquired image is precisely located in three dimensions (3D) and the features of the workpiece can also then precisely be located in the image itself, given that a correct calibration process of the camera has been done before. This calibration ensures that there is a known relation between a pixel of the taken image and the real world's size and that lens distortion is properly compensated.

BACKGROUND

The vision sensor or camera used in such a small scale 3D measuring machine has a very small depth of field; therefore usually a CAD model of the object to be gauged can be fed to and stored in the system as to know where to measure, and where holes, edges etc. should be so they can be avoided. Based on this a two dimensional scanning (2D scanning) of a more or less flat object with unknown small scale 2D geometry is possible, wherein more or less flat, means either completely flat, or with a very smooth height profile which could be tracked by serving the height of the sensor using a laser distance sensor.

Available measuring machines of these types are focused on different aspects: Beside the different scales (millimeter, micrometer, nanometer) they are adapted for, some are constructed in order to gain high speed measurements, others are constructed focused on a high precise measurement and others are created more to combine an acceptable speed with a reasonable preciseness and low cost.

With focus on a very fast measurement faster but more expensive vision measuring machines had been created by equipping the measuring machines with additional distance measuring units, like additional triangulation sensors or through-the-lens laser interferometers for distance measurements in particular allowing for faster and more efficient measurements in z direction. In those vision measuring machines usually more than one laser source is provided, wherein the emitted laser beams are distinguished by their different frequencies or signal codes. Using more than one laser source allows for determining simultaneously distances for as many points of the object surface as laser sources available. In another version of those measuring machines the various laser sources are used for creating a structured light pattern on the object surface for a large scaled, but less accurate measurement as it is known for 3D geometry acquisition of larger objects.

Another possibility for a very fast measuring machine, but having only one laser source for acquisition of very small dimensions of a workpiece is given in EP0270935A1. EP0270935A1 discloses a Coordinate Measuring Machine (CMM) based on a Delta Robot. The CMM has a fixed support table the object to be gauged is placed on. Further the CMM has a base plate provided to move in three coordinate directions x, y, z over the object to be gauged. The base plate is equipped with a camera for taking 2D images and with a laser distance measurement unit for distance measurement. The laser measurement unit has a laser emitter and a photosensitive detector for detecting a reflected laser light beam, emitted by the laser emitter and reflected by the object to be gauged. The distance measurement is used here in particular for focusing the camera. Therefore the emitted laser beam is emitted onto the object to be gauged at a location a bit ahead of the current position of the camera. The camera preferably has an optic with a small field of view for a high resolution. Further the CMM is provided with a global surveillance system having at least two stationary cameras observing the position of the workpiece and the movement of the base plate over the workpiece, wherein the stationary cameras having a large field of view. The focus of this measuring machine obviously is high speed measuring combined with reasonable preciseness. It can be driven in a high speed measurement mode with a quite good focusing of the camera, but the resulting system is complex and expensive.

Using measuring machines as described above, it is either possible to get a quite precise distance between the camera/laser source of the machine and of various points of an object by an expensive multi-laser source device or some cheaper a quite precise distance with respect to a small single spot of the object exposed to a single laser beam. Quite precise in this connection is always meant in relation to the absolute dimension of the object to be gauged and the distance between the object and the camera, the laser source and the laser detection unit, respectively. However, as already mentioned this quite precise information is only available very punctually and may—dependent on the properties of the reflecting surface—be afflicted with distinct uncertainties created by the noise detected together with the reflected laser light, particularly in case when laser speckles appear.

SUMMARY

Some embodiments of the present invention provide a measuring machine for acquisition of small scale 3D information that avoids most of the disadvantageous mentioned above. It is adaptable in a more flexible way to the effective requirements, i.e. of measurement speed, preciseness of the measurement, quality—(i.e. depth of focus) of the image(es), etc., while it simultaneously can be relatively low cost manufactured.

The measuring machine according to the invention may include a measuring machine for acquisition of small scale 3D information of an object to be gauged, wherein small scale means in the range of millimeters, micrometers, nanometers. For this purpose the measuring machine has a laser distance measuring unit, a camera and a control and analysing unit.

In some embodiments the laser distance measuring unit is a triangulation laser distance measuring unit provided with a laser light source for emitting a laser light beam. It has further a laser light sensor with photosensitive pixels of a detecting portion for detecting reflected laser light (wherein the reflected laser light is the laser light beam emitted by the laser source onto a surface and reflected from said surface and, wherein the surface of course is meant to be the surface of the object to be gauged but might accidentally be the surface of another object, e.g. of a support table supporting the object to be gauged). Between the laser light source and the laser light sensor is a triangulation baseline defined. The camera has photosensitive pixels arranged in a photosensitive area and serves as an imager for capturing 2D images of at least interesting parts of the object to be gauged. The control and analysing unit is configured to control the relative motion of the camera and the object to be gauged. It is further configured to determine the distance between the camera and the object surface impinged by the laser beam. The laser source is configured to generate a laser beam showing an oval or line-like cross-section having a length and a width, wherein its length is larger than its width. The control and analysing unit is configured to provide distance information based on information of active pixels of the detecting portion of the laser light sensor. Active pixels thereby mean pixels detecting reflected laser light of said oval or line-like laser beam with an intensity that is above a predetermined threshold of laser light intensity.

Dependent on the step width of camera movement and the orientation of the line-like or oval laser beam, said line-like or oval laser beam allows a further increase of the measurement speed. By using a laser beam of an oval or line-like cross-section and the accordingly configured control and analysing unit, distance calculation can be based not only on the information of one small spot of the surface of the object to be gauged—e.g. EP0270935A1 —, but based on the information related to the whole area of the object surface impinged by the oval or line-like laser beam. This is possible without having an additional laser source and is therefore cost saving compared to solutions given in the prior art. Increasing the laser spot's size to an oval or line-like cross-section thus results in a distance determination for various points or in a better averaging of the measurement coupled with an according noise reduction and in the consequence with a reduced measurement uncertainty and higher precision of the measurement.

In Some embodiments, the laser distance measuring unit operates based on triangulation principles, but it is also possible to use a distance measuring unit that operates based on time of flight principles or on phase shift principles.

Having a triangulation based laser distance measurement device the direction of the major axis of the oval laser beam or the linear extension of the line-like laser beam (short: the length of the oval or line-like laser beam) is advantageously adjusted to be orthogonal to the triangulation baseline. This allows averaging along the oval/line while getting a sharp peak across the line—both of which improve accuracy. The motion direction can be chosen in a random direction, but for a fast collection of information is advantageously chosen along the triangulation baseline. However, dependent of the current requirements a relative moving direction between the camera and the laser distance measurement unit on the one hand side and the object to be gauged on the other side can be as well be chosen perpendicular to oval or line-like laser beam or in any angle in-between. The different orientations are connected with different advantageous and disadvantageous well known by a skilled person.

In some embodiments the control and analysing unit is configured to determine one average distance over at least the active pixels of the detecting portion. Dependent of the gain it might also make sense to determine one average over all pixels of the detecting portion. In another embodiment the detecting portion is segmented in a predetermined number of groups of pixels and the control and analysing unit is—instead or in addition to what is described for the previous embodiment—configured to determine an average distance for one or more or all of said groups of pixels. In a further embodiment the control and analysing unit is—instead or in addition—configured to determine a distinct, individual pixel distance for each active pixel of the detecting portion. In a first version of these embodiments the control and analysing unit is configured to use—especially for averaging—only information of active pixels of the detecting portion that detect reflected laser light of an intensity that is above a predetermined threshold of laser light intensity. In a second version of these embodiments the control and analysing unit is configured to use the information of all pixels (active and none active pixels) of the detection portion for averaging.

One of various possibilities to calculate the distance is by determining the pixels' centre of gravity of light intensity of all pixels or at least of all active pixels of the detecting portion. Other algorithms such as peak interpolation and flank interpolation are also possible methods to determine the position of the spot.

Configuring the control and analysing unit in the way described above allows for generating results according to various, different requirements.

In order to reduce the negative impact of speckles the control and analysing unit is configured to control the relative motion of the detecting portion of the laser light sensor relative to the object to be gauged in such a way that a lateral displacement between the two is created while the reflected laser light received by the detecting portion is integrated so that an intentional "motion blur" is generated. The lateral displacement has a first displacement velocity in a first room direction and a second displacement velocity and a third displacement velocity in the other two room directions of a Cartesian System, wherein said first displacement velocity is preferably greater than the displacement velocity in the other two room directions, and wherein the first displacement velocity is particularly parallel to the triangulation baseline or orthogonal to the length of the cross-section of the oval or line-like laser beam.

The Lateral displacement can occur continuously or stepwise, wherein at least three but up to about ten steps are advantageous. Operating with said "motion blur" of a few line widths, preferable of about 4 to 7 lines widths increases the preciseness of the measurement. The width of the steps are adapted to result preferably in images of the reflected laser beam overlapping with each other or following each other immediately (handshaking images of the laser beam).

Is the laser intensity modulated during the intentional motion blur a temporal windowing function is obtainable, which temporal window function together with the lateral motion causes a spatial windowing function.

If the laser intensity is modulated during the intentional motion blur in a way that a temporal windowing function results, a spatial windowing function can be generated together with the lateral displacement. In particular the temporal windowing function is one out of a box windowing function, a triangular windowing function or a smooth windowing function. The easiest function to generate is probably the box windowing function. However, the most effective is the smooth windowing function. This is because—independent on the windowing function—speckles in the middle of the window, travelling over the whole laser beam during the motion are averaged out, so that they contribute more or less to zero. The speckles at the edge of the window, which during the motion appear only in the beginning or just before the laser is turned off, generate in contrary large errors. Having a smooth windowing function the intensity of speckles at the edge of the window is very small compared with the intensity of the "edge speckles" of a box windowing function, and the effect is spread out over a larger area on the surface leading to a larger degree of averaging. Thus, the contributed error of the "edge speckles" of a smooth windowing function is smaller than the contributed error of the "edge speckles" of a box windowing function. The results of triangular windowing functions are somewhere in the middle, depending of the slope of the ramp.

In some embodiments a portion of the pixels of the photosensitive area of the camera serves as the detecting portion of the laser light sensor of the laser measurement unit. Another portion of the pixels of the photosensitive area of the camera form an imaging portion, whereby the imaging portion or the pixels of said imaging portion, respectively, are configured for generating the 2D image. Thereby, it is possible that the pixels of the imaging portion and the pixels of the detecting portion are distributed in a mixed way—preferably mixed with an equal distribution—over the whole photosensitive area of the camera. Another possibility is that the pixels of the imaging portion and the pixels of the detecting portion are each arranged in distinct areas of the photosensitive area, which areas are arranged either in an overlapping manner or arranged in a clearly separated manner.

Having separate portions of pixels for imaging and for laser light detection within the photosensitive area of the camera makes a separate sensor for laser light detection and a separate camera, respectively, superfluous. It further allows a cheap and compact construction of camera and sensor and a compact over all structure of the measuring machine. In cases where the camera is provided with separate portions of photosensitive pixels, one for imaging and one for laser light detection, the measuring machine is able to capture 2D images and to detect reflected laser light for distance measurements simultaneously, which allows an increase of the measurement speed. If said pixel portions are located at distinct, different areas, it further facilitates the software used for analysing and differentiating laser light and light for the 2D images without the necessity of having polarized or invisible laser light.

In case of separate areas for the imaging portion and the detecting portion of the pixels of the photosensitive area of the camera, the dimension of the detecting portion is determined advantageously in a way that, when the camera is positioned in a range of suitable distance for being well focused, the image created by the reflected oval or line-like laser beam is considerable smaller than the detecting portion preferably with respect to the length and to the width of the oval or line-like laser beam but at least to one of both.

Although the measuring machine is provided with a distance measurement unit and a 2D images capturing camera, it would be appreciated that the machine can be used in modes, where either only the 2D images are taken by the camera or only distance measurements are carried out or of course in a mode where both functions are used. For an increased measuring rate in 2D-only or laser-only mode, the split between the two portions of the image should ideally be chosen so that an increased frame rate is possible. For instance, with an image sensor having one ADC dedicated per column it would be advantageous to make a horizontal split, and with a sensor having one ADC per row it would be advantageous to make a vertical split.

Further it is possible to provide two oval or line-like laser beams orientated with the length of their cross-section perpendicular to one another as seen, i.e. in a Cartesian x-direction and Cartesian y-direction, wherein the Cartesian x-direction and Cartesian y-direction defining projection planes of the 2D images captured by the camera. The two detecting portions are dedicated to the detection of reflected laser light, one detecting portion for each laser beam, wherein the detecting portions are particularly arranged perpendicular to each other They are placed preferably in the same plane and in particular at the edges of the photosensitive area of the camera.

In some embodiments there are four laser beams of the oval or line-like cross-section, two of these laser beams are orientated with the length of their cross-section in Cartesian x-direction and two laser beams are oriented with the length of their cross-section in Cartesian y-direction, wherein the Cartesian x-direction and Cartesian y-direction defining projection planes of the 2D images captured by the camera. The four detecting portions are dedicated to the detection of reflected laser light, one detecting portion for each laser beam, wherein preferably two detecting portions are arranged parallel to each other and spaced from each other and perpendicular to the other two detecting portions, which are parallel to each other and spaced from each other as well. The four detecting portions are in particular placed in the same plane and preferably arranged at the edges of the imaging portion of the photosensitive area of the camera.

In case of two or four laser beams of the oval or line-like cross-section emitted, these laser beams can be generated by only one laser beam or by one laser source for two emitted laser beams or one laser source per emitted laser beam.

In a preferred embodiment the laser source is configured in a way that it emits the laser beam of an oval or line-like cross-section in form of a fan like spread laser beam. This allows a very fast measurement and is cost saving. In another embodiment the laser source emits the laser beam of an oval or line-like cross-section in form of a fast moving laser point travelling over the object surface in a velocity that is recognized as a laser beam of an oval or line-like cross-section, especially by an accordingly programmed control and analysing unit. This solution might be a little bit more expensive, but is advantageous in case of a highly reflecting surface of the object to be gauged. It will be appreciated that the laser source can be equipped in a way that it can be switched between emitting a fan-like spread laser beam and a fast back and forth moving laser beam.

In some embodiments, the laser source emitting the laser beam is arranged movable or movable together with the camera, respectively. In particular the letter one makes distance measurement easy and also facilitates relating images to the according z-coordinate, as the distance between laser source and laser detector, which is part of the photosensitive sensor of the camera, as well as the distance between laser source and imaging portion of the camera are fix and known. Further, it can be advantageous to use a laser beam deflecting unit, i.e. a prism, a rotatable mirror and/or a laser light guiding optical fibre to increase the oval or line-like laser beam movability. Having a focusable laser beam might be advantageous as well. Movement and/or focus of the laser light beam and the movement and focus of the camera are coordinated in a way that the laser light beam reflected from the object to be gauged is detectable by the detecting portion especially if the detecting portion is part of the photosensitive area of the camera.

In case the laser beam of the oval or line-like cross-section is directed to a surface area of the object to be gauged, whereon the camera will only subsequently focus for capturing an image, precise focussing of the camera is facilitated.

Adjusting the detecting portion in the above described way and having a laser distance measurement unit operating based on the triangulation principle, the resolution, or with other words the detectability of small distance variations increases.

For creating a very compact measuring machine it is possible to have a measuring machine for acquisition of small scale 3D information of an object to be gauged with any of a laser distance measuring unit provided with a laser light source for emitting a laser light beam and a laser light sensor with pixels of a detecting portion for detecting reflected laser light and a camera serving as an imager for capture 2D images; and a control and analysing unit configured to control the relative motion of the camera and of the object to be gauged, and configured for determine the distance between the detecting portion and the camera, respectively, and the surface of the object impinged by the laser beam, wherein the camera serves as the laser light sensor of the laser measurement unit and has a photosensitive area with photosensitive pixels and a portion of said pixels of the photosensitive area (24) are the pixels of the detecting portion and another portion of said pixels of the photosensitive area forms an imaging portion and is configured for generating the 2D image. The control and analysing unit (8) is configured to provide distance information based on information of active pixels of the detecting portion, wherein active pixels are pixels detecting reflected laser light of said laser beam with an intensity that is above a predetermined threshold of laser light intensity.

Further embodiments and advantageous details are given in the dependent claims.

BRIEF DESCRIPTION OF THE FIGURES

The measuring machine according to the invention and the method according to the invention are described in greater detail purely by way of example below on the basis of some specific embodiments illustrated schematically in the drawings, further advantages of the invention also being discussed. Identical elements are identified by identical reference signs in the figures.

FIG. 8 illustrates scheme for visualizing various possibilities to determine a distance.

FIG. 11, 12, 13 illustrate each in a detailed enlargement, the photosensitive area of further embodiments of the measuring machine and the image caused by the reflected laser light of these embodiments on the pixels of the photosensitive area.

DETAILED DESCRIPTION

Figure 1A:
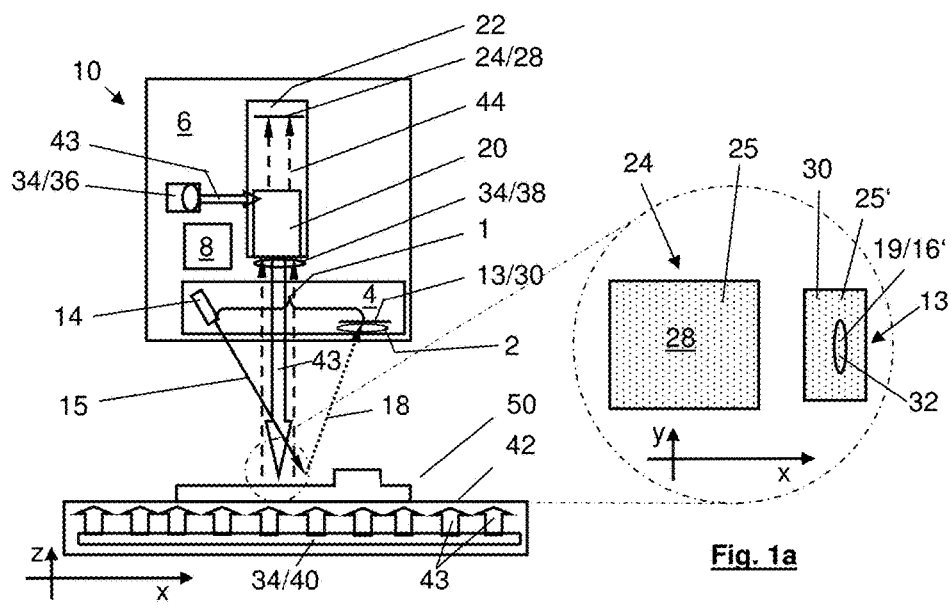
FIG. 1a, 1b illustrate a first embodiment of a part of a measuring machine according to the invention and in a detailed enlargement a detecting portion and a photosensitive area of the measuring machine with an image caused by a reflected laser light on the pixels of said detecting portion.
Figure 1B:
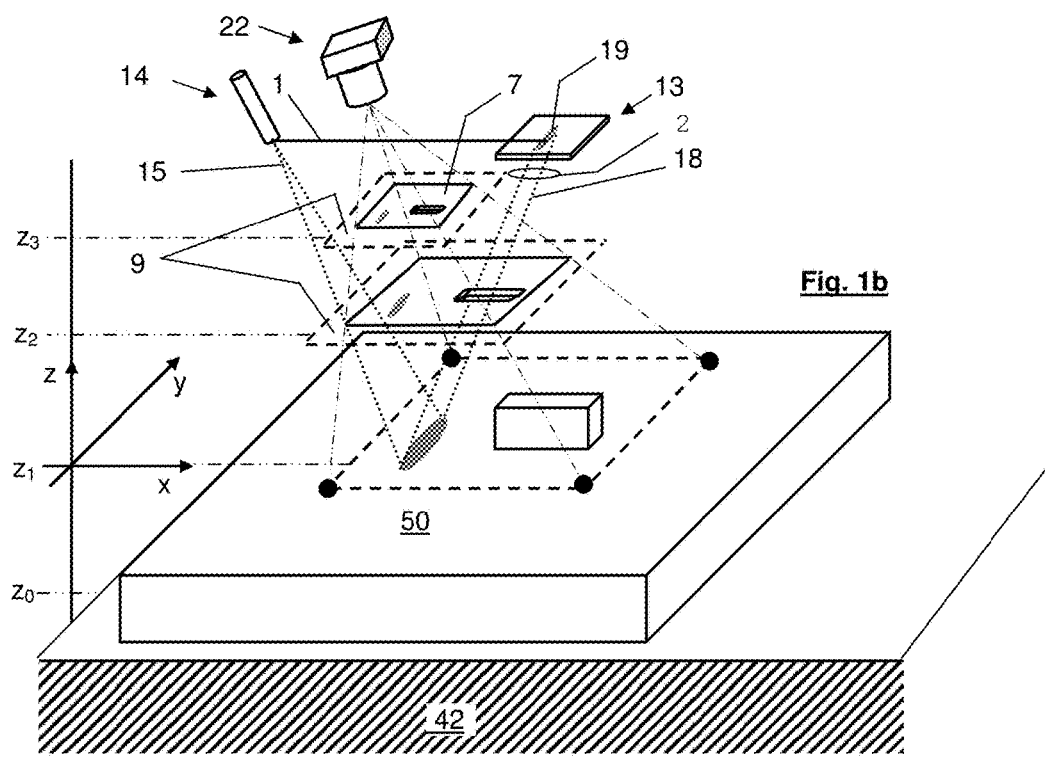

In FIGS. 1a, 1b a part of a measuring machine 10 according to the invention is shown schematically. It is a measuring machine 10 for acquisition of small scale 3D information, wherein small scale information means information in the range of millimeters, micrometers, nanometers. The vision measuring machine 10 has a camera 22, also called imager, and a laser distance measuring unit 4. The shown measuring machine is further provided with a support table 42 which in this example defines a plane oriented in x- and y-direction for carrying the object to be gauged 50 (also called workpiece 50) in a fixed manner. The transport table 42 and the camera 22 are arranged in a way that they are movable in relation to each other in all three Cartesian room directions x, y, z. In this embodiment the carrying plane of the transport table 42 is made of transparent material. Integrated in the support table 42 is a back illumination device 40 for illuminating the workpiece 50 from the backside according to current requirements. The camera 22 has a photosensitive area 24 and an objective 20. It is configured for taking 2 dimensional images 7 (2D image in x-, y-direction) from the surface or at least interesting parts of the surface of the object to be gauged 50.

The laser distance measuring unit 4 comprises a laser light source 14 for emitting a laser light beam 15 and a laser light sensor 13 for detecting the reflected laser light beam after it has been reflected by the workpiece 50 (also called reflected laser light 18). It further comprises an optical element, in this embodiment it is realized as an imaging lens 2, for focussing the reflected laser light 18 onto the laser light sensor 13. The light sensor 13 is provided with a detecting portion 30 having photosensitive pixels 25' for detecting reflected laser light 18. As said above, during the measurement the laser light beam 15 should be directed onto the surface of the object to be gauged 50 in a way that the laser light is reflected from there and is receivable as reflected laser light 18, which is focused onto the pixels 25' of the detecting portion 30 of the laser light sensor 13, i.e. by means of an imaging lens 2.

In the depicted sample of FIGS. 1a and 1b the laser light beam 15 is directed onto the surface of the workpiece 50 a bit ahead of the camera, so that the distance information can be used for adapting the focus of the camera for the next image to be taken. In said embodiment the laser distance measuring unit 4 works in accordance with the principles of laser triangulation, so that there is a triangulation baseline 1 between the laser light source 14 and the laser light sensor 13. In particular the triangulation baseline 1 is oriented along the x direction.

Figure 7A:
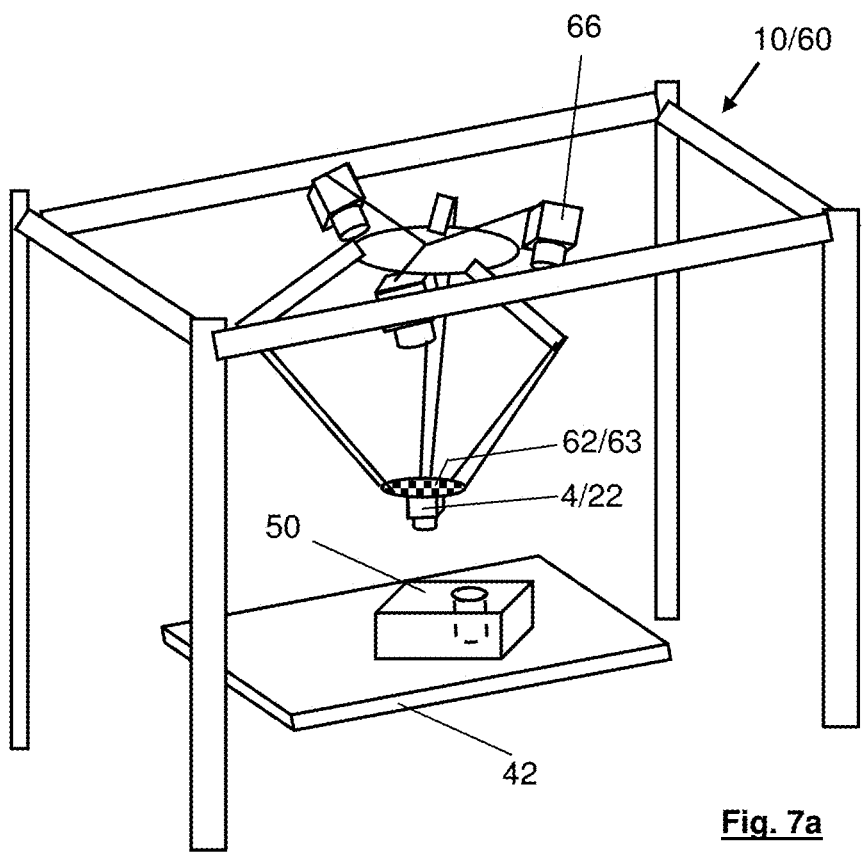
FIG. 7a, 7b illustrate a measuring machine according to the invention based on the principles of a delta robot.
Figure 7B:
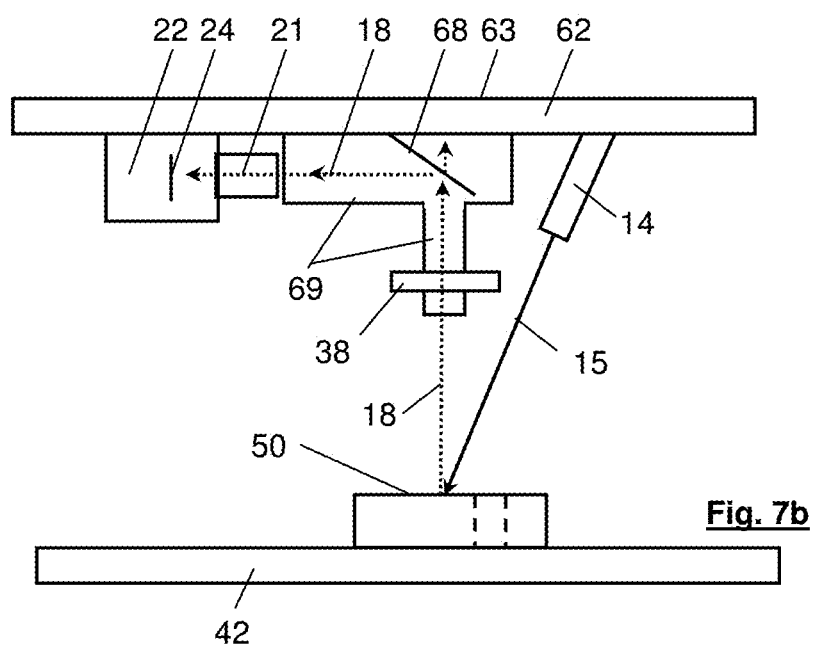

The vision measuring machine 10 is further equipped with a control and analyzing unit 8, which is configured together with the laser distance measuring unit 4 to provide distance information regarding the distance between the surface of the object to be gauged 50 and the laser light sensor 13 and/or the camera 22 with its photosensitive area 24. The control and analyzing unit 8, is further configured to control the relative movement of the workpiece 50 to be gauged and the camera 22 and the laser source 14. In this example the laser source 14 is arranged movable together with the camera 22. For this purpose the laser light source 14 and the camera 22 are mounted e.g. commonly in/at/on a movable support base (not shown), i.e. the tip of a robot arm or the movable tip of a portal measuring machine or the moving plate 62 of a delta robot 60 as one is depicted in FIG. 7a, 7b. In the example of FIG. 1a the camera 22 and the laser distance measurement unit 4 are integrated for this purpose in a common housing 6.

As it can be seen from the enlargement of FIG. 1a, the reflected laser light 18 causes a light image 19 on the pixels 25' of the detecting portion 30 of the laser light sensor 13. This light image 19 has in this embodiment the form of an oval. This is because the laser light source 14 in this example is configured to emit a laser light beam 15 of an oval cross-section 16' (see FIG. 1b) and the workpiece reflecting the laser light is plane. As it can be seen, the major axis of the oval cross-section 16', also called length of the oval laser beam, is in this example oriented in the y-direction that means orthogonal to the triangulation baseline 1. This orientation of the laser light beam cross-section allows a higher accuracy in the measurement of the distance between camera 22 and workpiece 50, as the spot is sharp in the depth-defining direction x (which improves accuracy) while being elongated in direction y and thus allowing averaging over the y-direction (which further improves accuracy). Averaging is described in detail based on FIG. 3 below.

In this embodiment the measuring machine 10 is further provided with various different illumination devices 34, usable according to the current requirements. Those illumination devices 34 are a ring illumination device 38 arranged surrounding an aperture of the objective 20 of the camera 22, a coaxial illumination device 36, the light 43 of which is guided coaxially with the field of view of the camera 22, and the already mentioned back illumination device 40 illuminating the workpiece 50 with light 43 from the back side. Further pattern projection is also possible as well as stroboscopic illumination. In some cases, a mix of the listed illumination principles also can be used in order to provide an even better image quality. The large variety of illumination options offers a lot of flexibility to measure any kind of workpiece, but also makes the image acquisition more complex, as the aperture time of the objective of the camera and the exposure time of the camera, respectively, has to be adapted to the illumination conditions. It also could be different for the laser, in the case where both, image and laser distances, are acquired on a single image.

In a preferred embodiment (not shown here) the laser source 14, the imaging lens 2 and the laser sensor 13 with its detecting portion 30 are arranged in away, that the Scheimpflug-conditions are fulfilled. In particular the detecting portion 30 might be tilted according to the Scheimpflug condition, so as to increase the depth range where the image of the oval like or line like laser beam is sharp.

As it can be seen from FIG. 1b the carrying plane of the transport table 42, which supports the workpiece 50, defines a first x-y-plane at a height $z_0$ in a Cartesian system. Camera 22 is in a position to capture a 2D image of an interesting part of the surface of the workpiece 50, wherein in this sample the main part of the surface of the workpiece 50 lies in a x-y-plane at a height $z_1$. There are further x-y-planes at heights $z_3, z_4, \ldots, z_i$ wherein the Cartesian x-direction and Cartesian y-direction define projection planes 9 of the 2D image captured by the camera 22.

Figure 2:
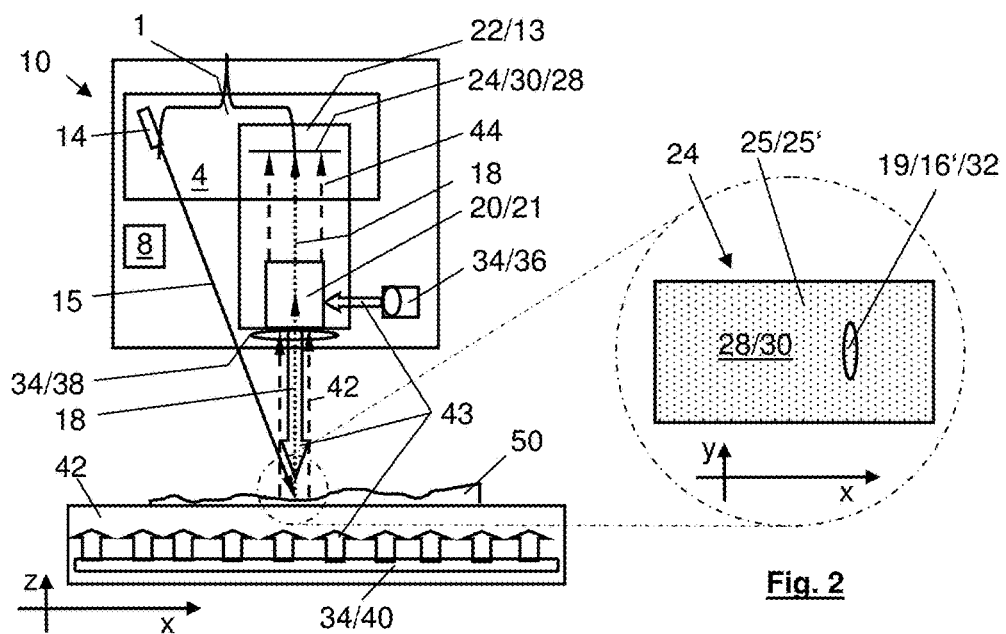
FIGS. 2-4, illustrate, in the same view as in FIG. 1a, further embodiments of the measuring machine and in a detailed enlargement the image caused by the reflected laser light of these embodiments on the pixels of the photosensitive area.

FIG. 2 shows an embodiment of the measuring machine, wherein the camera 22 serves for taking 2D images and also as laser light sensor 13, which allows a very compact construction. As shown in the enlargement on the right side of FIG. 2, the photosensitive area 24 of the camera 22 is provided with pixels 25, 25' (indicated by small dots spread over the photosensitive area 24). A distinct portion 25 of these pixels 25, 25' is configured for capturing the 2D image and is called image portion 28. Another portion of these pixels 25, 25'—the detecting portion 30 is configured for detecting reflected laser light 18. In this embodiment the pixels 25' of the detecting portion 30 and the pixels 25 of the imaging portion 28 are spread equally mixed over the whole photosensitive area 24 of the camera 22. The pixels 25' of the detecting portion are sensitive only for the wavelength of the laser light, wherein the pixels 25 of the imaging portion 28 are sensitive at least for some of the wavelengths emitted by the illuminations 34/40, 34/36 and 38, but not sensitive for the wavelength of the laser light. The generated laser light beam again has an oval cross-section with its major axis (length) in y-direction, which is orthogonal to the triangulation baseline 1, and with its minor axis (also called width) in x-direction. It will be appreciated that the relative movement of the laser distance measurement unit 4 and the camera 22 on the one side and the workpiece 50 on the other side can be in any random direction within the Cartesian x- and y-direction: x, −x, y, −y or any angle in-between (direction of a x-y-vector).

Figure 3:
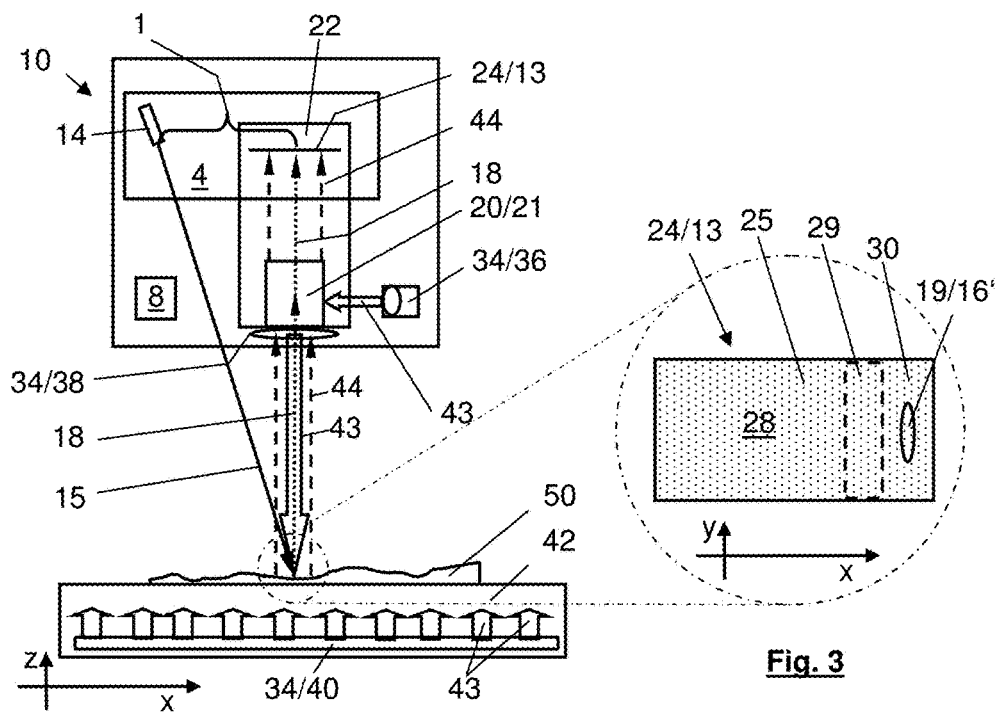

The embodiment of FIG. 3 is in principal constructed like the embodiment of FIG. 2, but the objective 20 of the camera 22 in the depicted case is a telecentric objective 21, so that the tolerance in distance between camera and workpiece 50 is enlarged. Further, as shown in the enlargement of FIG. 3 the imaging portion 28 with pixels 25 is allocated in the left part of the shown photosensitive area 24 of the camera 22 forming an imaging area, wherein the detecting portion 30 with pixels 25' provided for detecting the reflected laser light 18 is allocated on the right hand side of the photosensitive area 24 of the camera 22. As shown in FIG. 3 an overlapping area 29 might exist between the imaging portion 28/imaging area and the detecting portion 30/detecting area able to detect laser light 18 and to capture part of a 2D image.

Figure 4:
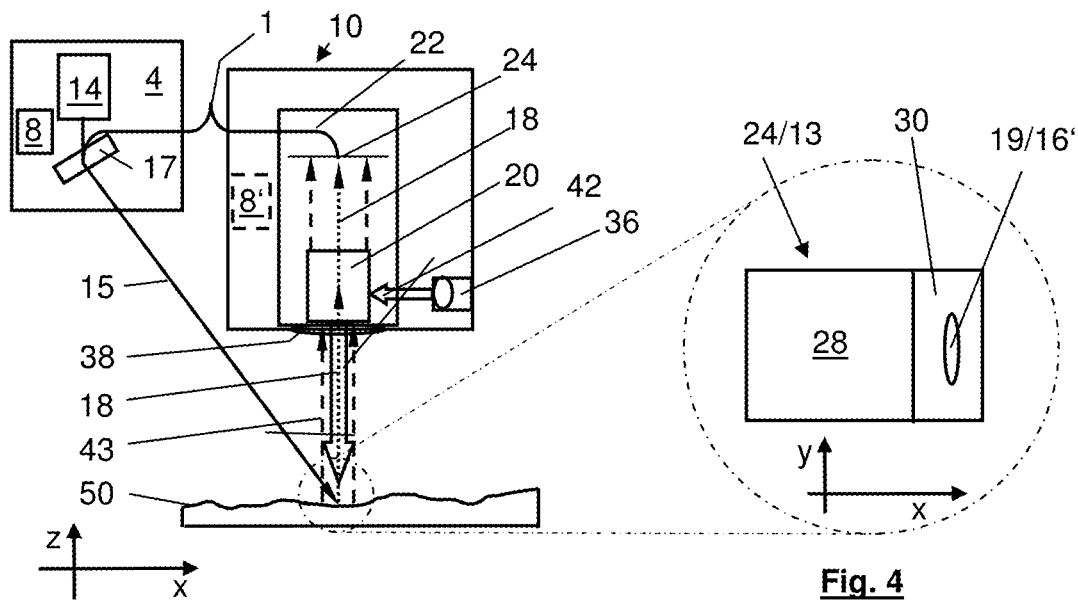

The embodiment given in FIG. 4 distinguishes from the one in FIGS. 2 and 3 in that the laser source 14 is arranged separate from the camera 22. The camera 22 is arranged, i.e. movable on the tip of a robot arm or the movable tip of a portal measuring machine or the movable plate of a delta robot. Wherein the location of the laser light source 14 is either independent of the camera but also on the movable tip or movable plate (see description of FIGS. 7a, 7b) or, i.e. at a fixed part of the vision measuring machine beside the robot arm or in/at/on the portal of a portal measuring machine or in/at/on the support construction 64 (supporting the movable plate 62) of a delta robot 60. In such an embodiment the laser beam 15 is directable onto the object to be gauged 50 by using a laser beam deflecting unit 17, wherein the laser beam 15 is preferably directable adapted to the motion of the camera 22. The laser beam deflecting unit 17 comprises in particular at least one of a prism, a rotatable mirror and/or a laser light guiding optical fibre. To ensure that at all distances the workpiece is impinged by a small well focused spot size of the generated laser beam 15 there is further a motorized laser focusing unit (not shown) provided. The control and analyzing unit 8 can be arranged with the laser source 14 or together with the camera 22, as it is indicated by the dotted line 8'.

A further difference is that in this example the photosensitive sensor 24 of the camera 22 (enlarged at the right hand side of FIG. 4) shows two clearly separated distinct portions:

an imaging portion 28 presented on the left and a detecting portion 30 presented on the right of the photosensitive area 24 of the camera. No overlapping area 29 exists.

As already mentioned FIG. 7a shows an embodiment wherein the vision measuring machine 10 is realized on the basis of a delta robot 60. The camera 22 and the laser distance measuring unit 4 are arranged at the movable plate 62 of the delta robot 60. The movement of the movable plate 62 is observed by a global measuring system, represented here by three observation cameras 66 fixed on the top of the delta robot 60 for determining the current position of the movable plate 62 in 6 dimensions of freedom using photogrammetry and some cooperative targets, particularly given in form of a reference surface 63 in form of a chessboard on the back side of the movable plate 62, which backside is visible for the observing cameras 66.

FIG. 7b shows an enlargement of the compact construction used in this specific embodiment of the measuring machine 10 based on a delta robot 60. The camera 22 with its photosensitive area 24 and its telecentric objective 21 is fixed on the movable plate 62. An angled tube 69 for the vision path (indicated by the incoming reflected laser beam 18) with an integrated mirror 68 is also fixed on the movable plate 62 and is arranged in a chain with the objective 21. The mirror 68 rotates the vision path by 90°. Around the lower part of the angled tube 69 for the vision path the ring illumination device 38 is arranged. The laser source 14 is arranged beside the angled tube and is also fixed on the movable plate 62. It will be appreciated that laser source 14 might have a focusing unit and might be fixed at the movable plate 62 in a way that it is pivotable, preferably with a spherical joint or at least the laser beam is movable accordingly by a mirror or prism etc. and/or that the laser source or the laser beam respectively is lateral movable, so that it might be adjustable if necessary by pivoting, focusing or moving it laterally. The use of the angled tube 69 with the mirror 68 allows a very compact construction and reduces the distance between the movable plate with the camera 22 and laser distance measurement unit 4 on one side and the workpiece 50 on the other side. As said before the chessboard pattern on the backside of the movable plate 62 serves as reference surface 63 for the global surveillance system. Minimising the distance between the workpiece 50 and the reference surface 63 for the global surveillance system reduces the error generated by an inaccurate angle measurement of the reference surface 63 by the global measuring system. A synchronised acquisition of the images of the global measuring system and of the camera 22 and the laser distance measuring unit 4, respectively, is advantageous to eliminate errors that would be generated by movements or vibrations between the timely separated triggers.

Figure 5:
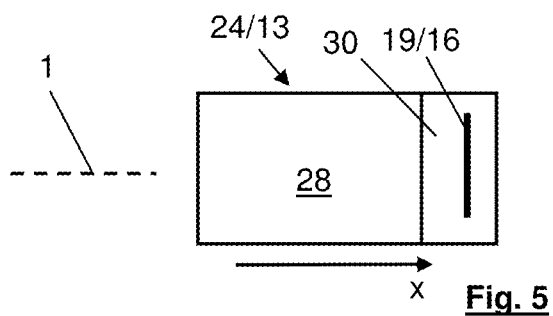
FIGS. 5, 6 illustrate, each in a detailed enlargement, an image caused on the pixels of the detecting portion by the reflected laser light of further embodiments of the measuring machine, respectively.

In a further embodiment (see FIG. 5) the laser source 14 is configured to emit a laser beam 15 of an line-like cross-section 16, wherein the line is again preferably oriented with its length orthogonal to the triangulation baseline 1 (direction, indicated by the dotted line 1), which preferably coincides with the relative movement of the camera 22 and the object to be gauged 50, so that the light image 19 of the reflected laser beam 18 appears accordingly on the detection area 30 of the photosensitive area 24 of the camera 22, as it is shown in FIG. 5.

Figure 6:
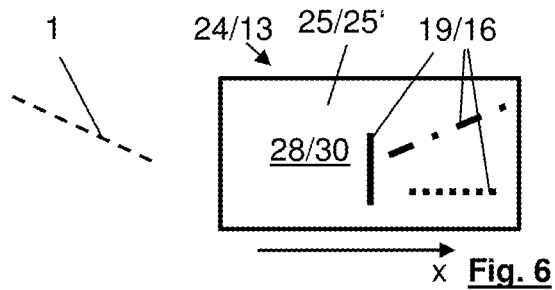

Nevertheless, it is also possible to operate the measuring machine 10 with a laser light beam 15 of an oval 16' or line like 16 cross-section oriented with its length in any angle in-between 30° and 90° to the triangulation baseline 1. In FIG. 6 three samples of laser beams with a line-like 16 cross-section (full line, dotted line, dashed line) and with such an angled orientation with respect to the triangulation baseline 1 (indicated by the dotted line 1 on the left side of the figure) are given in FIG. 6; wherein the triangulation baseline 1 in this embodiment is oriented in an angle of about 45° with respect to Cartesian direction x. As mentioned before the relative moving direction regarding the x- and y-directions as well can be chosen having any x-y-vector. However, with respect to measuring accuracy and software simplicity it is advantageous to have the length orientation of the oval or line like cross-section of the laser beam near-orthogonal to the triangulation baseline, wherein near-orthogonal means a deviation of up to ±25° to ±30° will still work but not as good as deviations in a range of ±0° to ±10°.

As in FIG. 2 the embodiment shown in FIG. 6 shows a photosensitive area 24 of the camera 22 having no separated detecting portion 30 and imaging portion 28, but the pixels 25, 25' of these portions are mixed. In this configuration a high intensity difference between the reflected laser light 18 and the light for the 2D image is necessary. Said Intensity difference has to be high enough that the intensity level can clearly be distinguished. Other possibilities to distinguish the light signals are distinguishing by wavelength, by a modulation or polarisation of the laser light, so that pixels sensitive for the different wavelength the modulated or polarized light are mixed with pixels sensitive for light of at least the illumination device 40 not not of the wavelength, not modulated, not polarized in the way the of the laser light is. In such a case the pixels for image capturing and for laser light detection might be mixed within the same area or at least within an overlapping area (see FIG. 2), which results in a compacter photosensitive area and a compacter over all structure. However, a more complex software might be needed in such a case to distinguish the information usable for distance determination and for the 2D image.

By using a laser beam 15 of an oval 16' or line-like 16 cross-section and the accordingly configured control and analysing unit 8 the distance information not only of a small spot at the object to be gauged but of a distinct area of the surface of the object can be used for distance calculation. FIG. 8 shows a scheme exemplifying various possibilities to do so based on a laser beam having a line-like cross-section 16 (but it is also applicable for an oval 16' laser beam). To increase the laser spot's length while reducing its width results in a better averaging of the measurement and reduces the noise accordingly. This results in a reduced measurement uncertainty.

In a preferred embodiment the control and analysing unit 8 is configured (see FIG. 8) to determine—according to the current requirements—one single average distance h1.1 based on the information of the pixels 25' of the detection area 30 by, i.e. determining the pixels' centre of gravity of the light intensity, and/or to calculate several average distances h2.1, h2.2, h2.3 to h2.$n$ along the line 16 by cutting the line 16 or the pixels 25' of the detecting portion 30, respectively, into segments, also called groups 26.1, 26.2, 26.3 to 26.$n$ and determining the pixels' centre of gravity of light intensity for these segments/groups. Thereby the control and analysing unit 8 is configured to use only the information of those pixels 25' of the detecting portion 30, which received an intensity of reflected laser light 18 above a predetermined intensity-threshold, so called active pixels 32. However, it is also possible that the control and analysing unit is configured to use the information of all pixels of the detecting portion 30, irrelevant whether they are active pixels and impinged by reflected laser light 18 or not. This in particular is possible, if the detecting portion 30 is separated in a detecting area. In the extreme, pixel distances h3.1 to h3.n can be determined either for a selected number of pixels of the detecting portion 30 arranged in a predetermined way and/or for every pixel of the detecting portion 30, in particular for every active pixel impinged by an intensity of reflected laser light 18 above a predetermined intensity-threshold. However, other methods to determine the spot location are also possible, for instance parabolic peak interpolation or by flank interpolation on each side of the peak and at the same height followed by averaging to get the centre point.

In order to reduce the negative impact of laser speckles the control and analysing unit 8 is configured to create a lateral displacement while the camera is integrating the received light, what is called an intentional generation of motion blur or short: intentional motion blur. This reduces the effect of the speckles, as the intentional motion blur acts as an averaging of non- or even anti-correlated speckle effects. In order to create the intentional motion blur and to acquire a well-exposed image of the wanted area in a single shot, the speed of the relative movement of the camera 22 and the workpiece 50 is well controlled as well as the motion direction and in particular the laser intensity.

If the motion of the camera 22 relative to the workpiece 50 is parallel to the triangulation baseline 1 orientation and the exposure time is great enough to create a "motion blur" over several laser line widths, then the achievable accuracy is very high since for each pixel many laser speckles are averaged in the same image, and the contribution from different positions within the motion blur even is anti-correlated so that the error diminishes much more quickly than is the case for uncorrelated contributions.

During an intentional motion blur the laser intensity can be modulated to get a temporal windowing function (which is transformed into a spatial windowing function by the relative motion of camera 22 and workpiece 50 during the intentional motion blur) what makes the result less sensitive to speckle effects at the edges of the function. In such an embodiment the control and analysing unit is configured to use a "box windowing" function (see FIG. 9, indication number 70), a "triangle windowing" function (not shown) or a "smooth windowing" function (see FIG. 10, indication number 72) for weighted averaging the detected light of the speckles.

Figure 9:
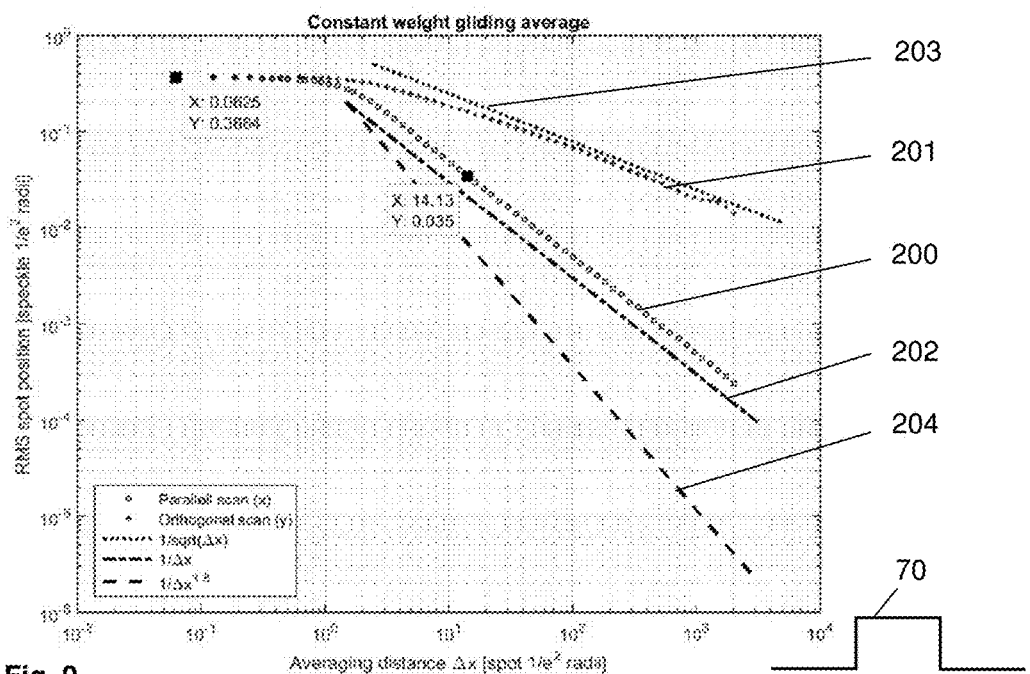
FIG. 9 illustrates results calculated using an intentional motion blur with a box windowing function for modulating the intensity of the emitted laser beam.

FIG. 9 shows a standard deviation in form of a so called Constant weighted gliding average of the estimated position of the laser spot as function of gliding average with window length N for a moving direction parallel (x) and orthogonal (y) to the triangulation baseline 1 (see FIG. 1a) when moving the laser beam 15 with its spot of oval 16' or line-like 16 cross-section during the intentional motion blur over a rough surface (rough in the sense of micro-roughness or diffuse surface). A gliding average with window length N is a simple form of low-pass filtering, i.e. the gliding average function g of a value x with window length N is: $g(i) = \text{sum}(x(j), j=i-N+1 \ldots i)$. Note that the horizontal axis of the diagram is given in normalized units of the spot radius while the vertical axis (RMS=Root Mean Square) is given in normalized units of the speckle feature size, so that the units are independent of the exact spot size and sensor geometry and the plot is true for all variations assuming that the spot has a Gaussian intensity profile.

Figure 10:
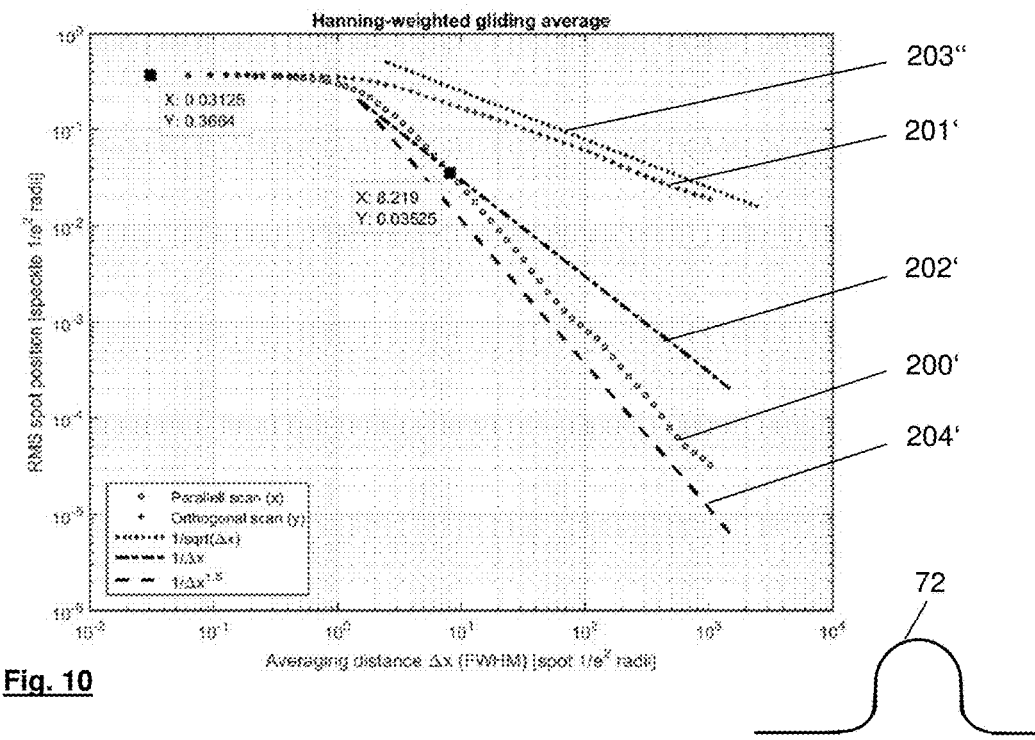
FIG. 10 illustrate results calculated using an intentional motion blur with a smooth windowing function for modulating the intensity of the emitted laser beam.

The same is in principle applicable for FIG. 10, but while in FIG. 9 a box-windowing function 70 has been used, the curves in FIG. 10 show a RMS spot position error as a function of averaging distance using a smooth windowing function 72 for weighted averaging (Hanning-window weighted average). The horizontal axis shows the window full-width at half maximum (FWHM), which is the width of a smooth windowing profile at half maximum height.

As it can be seen in FIGS. 9 and 10, the standard deviation, also called error in the spot position is reduced considerable as in case of a parallel moving with respect to the triangulation baseline 1 of the laser spot during the motion blur when increasing the FWHM (curves 200, 200' in FIGS. 9 and 10/x-direction in FIG. 1a)), while the error only diminishes slightly as when scanning orthogonal to the triangulation baseline 1 (curves 201, 201'). Note also that in case of circular spots the results are not affected by the size of the laser beam spot when it impinges the surface of the workpiece 50. The averaging behaviour likewise is not affected by the speckle size. In general it can be stated that it works the better the more spot-widths fit within the averaging distance of a motion blur. As an example of the magnitude of improvement, it is possible (see FIG. 9) to reduce the error in the spot position by a factor of ten by averaging over about 7 spot width using a box windowing function; or with other words the accuracy can be improved by a factor ten when during the intentional motion blur the image of the laser beam 15 on the surface to be gauged moves a distance of 7 spot widths assuming an orientation of the laser beam with its length orthogonal to the triangulation baseline 1 and a blur motion along the triangulation baseline 1.

As can be seen in FIG. 10 it is beneficial to do a weighted average with a smooth windowing function rather than a gliding average which has a "rectangular" weight function, called also box windowing function. The diminishing "tails" of a smooth windowing function in effect suppresses the influence of speckles that have not travelled over the entire spot. In FIG. 10, the results are shown when using a smooth windowing function, in particular a Hanning-windowing function. As can be seen, the slope of curve 200' is now almost −1.5. Using a smooth window function, it is only necessary to average over about 4 spot diameters/widths to lower the error by a factor of ten compared to averaging over about 7 spot diameters/widths using a box windowing function (see above and FIG. 9).

Thus, as a resumé it can be stated comparing the slope of the curves 200 (FIG. 9) and 200' (FIG. 10)—each obtained by a parallel scan (x)—the slope of curve 200' in FIG. 10 (smooth windowing function 72) is much steeper than the slope of curve 200 in FIG. 9 (box windowing function 70). The longer the motion blur is, the stronger the benefit of a smooth window, or with other words, an improvement of a factor of 10 in precision regarding the RMS spot position error could be achieved with a smooth windowing function by a 4 spot-widths motion blur instead of a 7 spot-widths motion blur using a box windowing function. So, the lateral resolution in the direction of the triangulation baseline could almost be doubled by using the smooth windowing function for averaging out the error generated by the speckle effect.

It should be mentioned that using a triangular windowing function (not shown) the obtained results are nearly as good as with a smooth windowing function (dependent a bit on the slope chosen for the flanks of the triangle), but the triangular windowing function—depending on the equipment—may be easier to achieve.

The above described methods for determining a distance using a single average h1.1 or various averages h2.1-h2.n or h3.1-h3.n with or without considering speckle effects is applicable not only with embodiments working with a single oval or line-like laser beam 15 as shown in FIG. 1-6 but also with embodiments working with more than one of such laser beams. In case of more than one laser beams, the measuring machine can be equipped with one laser beam source for every such a laser beam. However, the various laser beams can also be generated by a single laser source, wherein the original emitted laser beam of this single laser source is split into two or more laser beams. (A skilled person knows the equipment necessary to obtain the desired number of laser beams.) To split the originally emitted laser beam is only limited by the needed intensity, which depends on the light absorbing properties of the workpiece as well as of the sensitivity of the chosen pixels of the detecting portion 30 etc. Thus a vision measuring machine with two such oval or line-like laser beams may have two laser sources or may have only one laser source. A measuring machine with four oval or line-like laser beams may have one, two, three or four laser sources etc. One will appreciate that it is possible to have not only one kind of laser beams but that it is possible to have a mixture of laser beams having a line-like cross-section 16 and an oval cross section 16', respectively. Having more than one oval or line-like laser beams 15 it is advantageous to have a partitioned photosensitive area 24 as it is shown in FIGS. 11, 12, 13; in particular with a distinct detecting portion 30, 30a, 30b, 30c, 30d for each oval or line-like laser beam.

If there are two of the oval or line-like laser beams generating two distinct images 19a, 19b on the photosensitive area 24 it is advantageous to have two detecting portions 30a, 30b dedicated to each laser beam 19a, 19b as shown in FIG. 6. In case the laser beams are orientated perpendicular to one another, so that their oval or line like images 19a, 19b can be detected as it is shown in FIG. 11, distance measurements of the same quality in x- and in y-direction are possible. In such a case it would be advantageous to have different triangulation baselines for the two laser beams, which are preferably also perpendicular to one another, or in case there is one common triangulation baseline, the two perpendicular oval or line-like laser beams are rotated against the common baseline, so that none of them is parallel to the triangulation baseline, preferably they are rotated by 30° or 45°. In such a case the detecting portions 30a, 30b are arranged advantageously also perpendicular to each other and preferably at the edges of the photosensitive area 24 of the camera 22 (see FIG. 11).

However, the feature of two detecting portions 30a, 30b perpendicular to each other can also combined with a single laser beam movable in a way that its image appears on the one or the other detecting portion and its orientation my adaptable also according to the current requirements. Further this arrangement of detecting portions can be combined with one or more laser sources movable independently of the camera. The two detecting portions can be coupled with the control and analysing unit in a way that they can be dedicated to the one or more laser beams in dependence on the current requirements, i.e. dedication can be changed depending on the moving direction or depending on whether distance information in moving direction or perpendicular to the moving direction is needed etc.

As shown in FIG. 12, it would be possible as well to detect two perpendicular oriented laser beams 19a, 19b with a single detecting portion 30, wherein the dimensions of the detecting portion 30 is adapted accordingly and wherein in particular the images 19a, 19b of the two deflected laser beams impinging the detecting portion 30 allowed to cross each other, as it is indicated in FIG. 12 or the two ovals or lines projected sequentially and captured in two independent images. Of course the analysing software has to be adapted accordingly.

What is described in the paragraphs before is also applicable for the detecting portions and the laser beams/laser sources described below.

Having four laser beams 15 resulting in four reflected laser beams 18 and accordingly in four detectable images 19a, 19b, 19c, 19d an even better situation may result, in particular if they are sent to the surface of the workpiece 50 spaced from each other and two of them are oriented parallel to each other 19a, 19c, but perpendicular to the other two 19b, 19d. The most easiest way to detect these laser beams then would be to have four separated detecting portions 30a, 30b, 30c, 30d, two of them 30a, 30c parallel to each other and preferably spaced from each other and perpendicular to the other two detecting portions 30b, 30d, which are preferably spaced from each other as well, and wherein the detecting portions 30a, 30b, 30c, 30d are advantageously arranged at the edges of the imaging portion 28 of the photosensitive area 24 of the camera 22, as it is shown in FIG. 13. It is advantageous to have four laser beams and a sensor area 24 as shown in FIG. 13, if the moving direction of the camera is x and y as well as −x and −y and combinations thereof or in cases where distance information for all pixels of the image should be gathered.

An advantage of having four laser beams with oval or line like cross-section is that it is possible to measure very close to topographic vertical steps in the objects to be gauged, irrespective of the direction of the step. Each laser beam is projected from a different direction, and surface points below a topographic step will be shadowed by the step itself if the laser comes from the "high side" of the step. With four beams, there will always be at least one laser beam with coverage near the step as long as the width of the pit is not so small that there is another opposite step too close.

All embodiments of a photosensitive area 24 shown herein are very compact sensors and allowing a cost saving and compact over all structure of the vision measuring machine 10.

Figure 14:
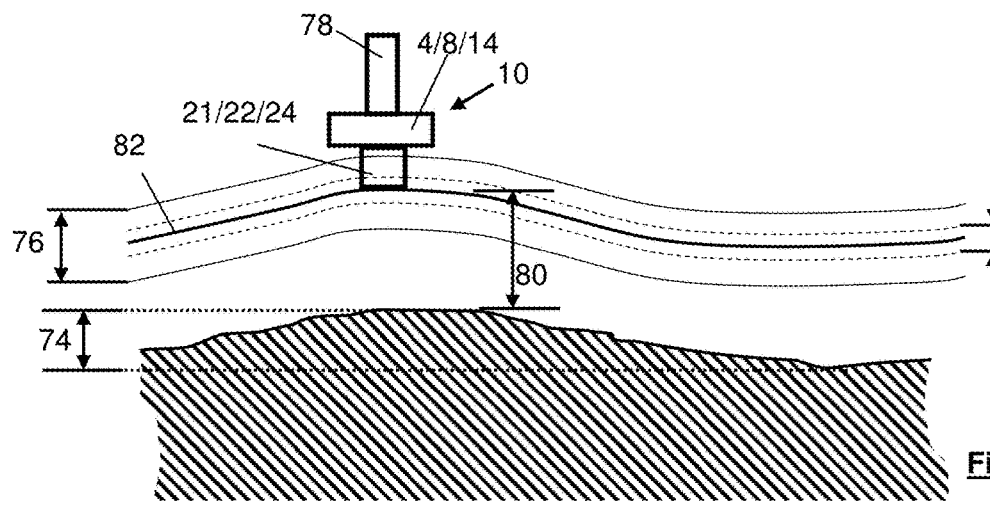
FIG. 14 illustrate a possible working path of a camera having a telecentric objective.

In a preferred embodiment the measuring machine 10 claimed herein is provided with a telecentric objective 21 (see FIG. 14). Compared with usual measuring machines equipped with entocentric objectives the tolerance 76' (limited by image scale uncertainty) of the working distance 80 between the camera 22 and the object to be gauged 50 is enlarged to a tolerance 76 of the working distance 80 by the use of the telecentric objective 21. Thereby the possible measuring speed is increased.

In detail, as shown in FIG. 14, the workpiece tolerance 74 must be added to the positioning tolerance 76 of the carrier 78, to get the needed depth of field of the camera 22. Depending on the type of the telecentric objective 21 the camera 22 is equipped with, the enlargement of the working distance 80 can be at least several tenths of micrometers. The control and analysing unit 8 has of course to be configured accordingly.

The enlarged working range of the camera 22 together with the fast measuring of the working distance in z-direction, which is possible with the above described laser measuring unit 4, allows a fast regulation loop, wherein regulation loop means measuring the working distance 80 with the laser measuring unit 4 and move the camera 22 fast enough in z-direction to obtain a sharp two dimensional image. Thus, using the telecentric objective 21 allows for a fast scanning of a workpiece surface 50. It facilitates the measurement as the working distance between the camera and the object to be gauged can vary in a somewhat larger extend than with an entocentric objective without affecting the image scale error. Having a measuring machine configured this way it is not necessary any more to keep the distance between workpiece surface and camera constant in such a very precise way and thus the speed for image scanning can be increased. Even in cases where the workpiece shows sharp edges or, e.g. a borehole, orientation loss of the camera at least in z-direction, which easily occurs with an entocentric objective, is avoided to a large extend when using a telecentric objective 21.

A further advantage of the telecentric objective is that images do not show any depth information, what makes measurements more reliable. It also allows for image stitching, as features look the same from all positions. Image stitching can be used to generate bigger images from several smaller images by placing the small images immediately side by side without overlapping and without any gap between them (also called handshaking images). Generating such bigger images is of big advantage, for example when the used camera carrier is fast, like in the case of a delta robot.

Figure 15:
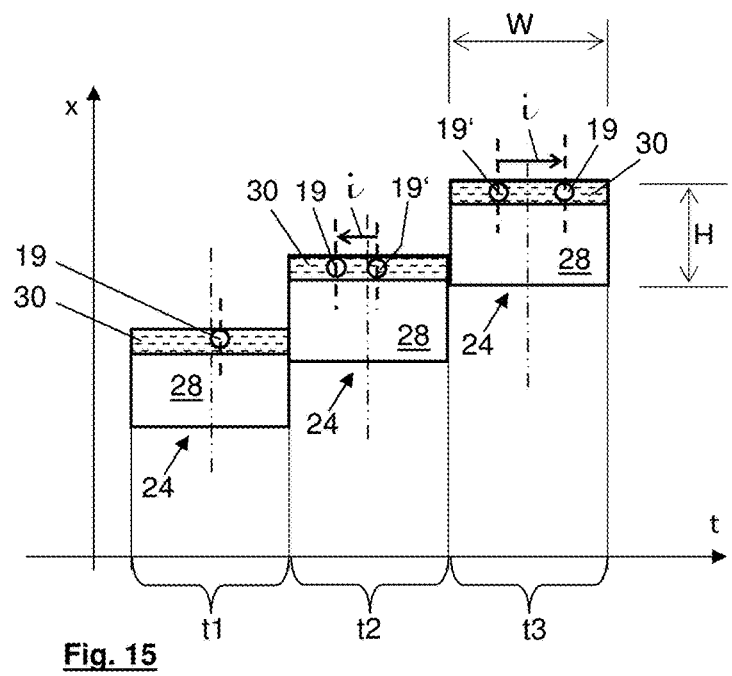
FIG. 15 illustrate a possible scheme of working steps carried out with a measuring machine according to the invention.

Using the image acquisition sequence shown in FIG. 15 the distance (also called z-information) calculated in one frame can be used as the height in the middle of the image of the next frame. This can be of advantage if the position of the centre of gravity of the image is desired, but it also can be a disadvantage, if the image of a borehole was just acquired. In this case, it is better to use the height information at the border of the image (the height information in the same frame). In any case, the distance measuring sensor can be operated independently of the 2D image sensor to probe a good position selected individually for each feature.

In order to be able of taking full advantage of the laser distance measurement unit 4 and a fast carrier 78 the control and analysing unit 8 is in a further embodiment configured with a smart algorithm dealing with the z-information:

In case a CAD file of the object to be gauged 50 is available, information about the object stored in the CAD file can be used to determine if the integrated triangulation sensor has a chance to gather valuable information. If it is, for example, clear that the emitted laser beam 15 will not hit the surface of the workpiece 50, as the measurement is close to the workpiece border, the returned information should not be used and an additional frame, located there where the laser would hit the surface has to be added.

If no CAD file is available, the z-information is temporarily stored and then, when the workpiece is sufficiently known (location of borders and boreholes, etc., the z-information is checked, with respect of its plausibility, or with other words, it is controlled, whether the z-information comes from suitable or non-suitable locations. If the latter is the case, the information is eliminated and if possible replaced by a more suitable z-information. This is possible, if the workpiece geometry is better known after, i.e. a first quick scan, wherein in some cases, it makes sense to have a first acquisition sequence only with the image and a second one, following the same path, only with the laser distance measurements or vice versa. This is in particular a good strategy if the carrier is fast, for example if it is a delta robot.

To minimise the risk, not to have the correct information supplied by the integrated triangulation sensor, it is possible to provide the measuring machine with a second triangulation sensor. Said second triangulation sensor evaluates z-information by using the same single photosensitive area 24 of the camera 22, but is focused on a different area of the workpiece 50. By doing so, the probability not to have any z-information is considerably reduced.

The amount of data generated by vision measuring machines described herein is enormous, especially when the speed of imaging is increased. Therefore an intelligent handling of the data is essential. However, the gathered images, including the distance or z-information of the laser distance measuring unit 4, can be handled in very different ways: All images and all the distance or z-information is instantly transmitted to a computer for further processing at this computer (Streaming measuring Mode). But this procedure might become difficult, if the image quantity is big, what most likely happens with a fast camera carrier. Alternatively or complementarily, images are stitched together and returned as a whole, a single big image, like if the used optics would be very big or have a specific shape. This drastically would reduce the cost of the needed optics (Big Optics Simulation measuring Mode). Alternatively or complementarily, images could be forwarded with several distance information covering the image surface. Alternatively or complementarily, straight or curved edges borehole locations or any other feature can be recognized by the control and analysing unit and can be locally extracted. Only said extracted compact feature information (borehole location and diameter for example) is transmitted, what drastically reduces the data flow (Comprehensive Feature measuring Mode). Alternatively or complementarily, locations of arcs or edges and their orientations are transmitted directly (Edge Detection measuring Mode). Alternatively or complementarily, the fast measuring machine is used in a so called Compatibility Working Mode, wherein the provided software results in a transparent use of the measuring machine, as if the machine would be a measuring machine of the previous generation. In case an entocentric objective is used a further alternative is possible: Images of the same feature are taken from different locations, which results in a stereovision which further allows 3D image reconstruction (3D measuring Mode).

A person skilled in the art will recognize that and in which way details of the different embodiments described herein can reasonable be combined. However, for lack of space it is not possible to describe and/or show in the figures all meaningful combinations of embodiments or details of embodiments.

As has been shown herein a measuring machine with a camera and a laser distance measuring unit as described above is advantageous for acquisition of small scale 3D information, as the distance between the camera and an object to be gauged, can be calculated based not only on the information generated by a small laser spot, but based on the information of an oval or line-like light image caused by the reflected laser light of an emitted laser beam of oval or line-like cross-section on the photosensitive area. This allows for a flexible adaptation of distance calculation to the current requirements and a better relation of costs for the measuring machine, the possibility of a fast measurement and precision of the measurement. In detail it allows for: higher speed image scanning and higher speed laser scanning, which results in a higher throughput; generating flexible distance information at different positions of an image; synchronous or well-located distance information; reduced speckle based errors; faster and more efficient image stitching; local image treatment for reduced data transfer rates; on-the-fly measurement (z distance regulation at high speed).

What is claimed is:

1. A measuring machine for acquisition of small scale 3D information of an object to be gauged, the measuring machine having a triangulation laser distance measuring unit provided with a laser light source for emitting a laser light beam and a laser light sensor with photosensitive pixels of a detecting portion for detecting reflected laser light and with a triangulation baseline between the laser light source and the laser light sensor;

a camera having photosensitive pixels arranged in a photosensitive area, wherein the camera serves as an imager for capture 2D images of at least interesting parts of the object to be gauged; and a controller configured to control the relative motion of the camera and of the object to be gauged, and configured to determine the distance between the camera and the surface of the object impinged by the laser beam, and the laser source is configured to generate a laser beam showing an oval or line-like cross-section having a length and a width, wherein its length is larger than its width, and the controller is configured to provide distance information based on information of at least active pixels of the detecting portion of the laser light sensor, wherein active pixels are pixels detecting reflected laser light of said oval or line-like laser beam with an intensity that is above a predetermined threshold of laser light intensity wherein:

a portion of the pixels of the photosensitive area of the camera serves as detecting portion of the laser light sensor of the laser measurement unit; and another portion of the pixels of the photosensitive area forming an imaging portion of the laser light sensor of the laser measurement unit and is configured for generating the 2D image; and wherein the imaging portion of the pixels and the detecting portion of the pixels are distributed in a mixed way over the whole photosensitive area of the camera.

2. The measuring machine according to claim 1, wherein the controller is configured to determine one average distance based on one average height over at least all active pixels of the detecting portion.

3. The measuring machine according to claim 1, wherein the controller is configured to determine average distances based on average heights over one or more or all groups of pixels out of a predetermined number of groups of pixels the detecting portion is segmented in.

4. The measuring machine according to claim 1, wherein the controller is configured to determine a distinct pixel distance for at least each active pixel of the detecting portion.

5. The measuring machine according to claim 1, wherein the generated laser beam with its oval or line-like cross-section is adjusted with the length of its cross-section orthogonal to the triangulation baseline.

6. The measuring machine according to claim 1, wherein:
the controller is configured to control the relative motion of the camera and of the object to be gauged in such a way that a lateral displacement of the detecting portion of the laser light sensor relative to the object to be gauged is created while the reflected laser light received by the detecting portion is integrated so that an intentional motion blur is generated, wherein the displacement has a first displacement velocity in a first room direction and a second displacement velocity and a third displacement velocity in the other two room directions of a Cartesian System, wherein said first displacement velocity is preferably greater than the displacement velocity in the other two room directions, and wherein the first room direction is parallel±30 degrees to the triangulation baseline or orthogonal±30 degrees to the length of the cross-section of the oval or line-like laser beam.

7. The measuring machine according to claim 1, wherein the laser source emitting the laser beam is arranged relative to the detecting portion in a fixed position with a constant distance between the laser source and the detecting portion.

8. The measuring machine according to claim 1, wherein the controller is configured to control the relative movement of the laser measurement unit and the object to be gauged in such a way, that the angle between the orientation of the length of the cross-section of the oval or line-like laser beam and the object to be gauged is 90°±45°.

9. The measuring machine according to claim 1, wherein there are two of the oval or line-like laser beams orientated with the length of their cross-section perpendicular to one another as seen in a Cartesian x-direction and Cartesian y-direction, wherein the Cartesian x-direction and Cartesian y-direction defining projection planes of the 2D images captured by the camera, and wherein two detecting portions are dedicated to the detection of reflected laser light, one detecting portion for each laser beam, wherein the detecting portions are arranged to each other.

10. The measuring machine according to claim 1, wherein the laser light source produces four laser beams of the oval or line-like cross-section, two of these laser beams are orientated with the length of their cross-section in Cartesian x-direction and two laser beams are oriented with the length of their cross-section in Cartesian y-direction, wherein the Cartesian x-direction and Cartesian y-direction defining projection planes of the 2D images captured by the camera, and that there are four detecting portions dedicated to the detection of reflected laser light, one detecting portion for each laser beam, wherein two detecting portions are arranged parallel to each other and spaced from each other and perpendicular to the other two detecting portions, which are parallel to each other and spaced from each other.

11. A method for acquisition of small scale 3D information, the method comprising:

emitting a laser light beam onto a surface of an object to be gauged so that it is reflected to a photosensitive pixels of a detecting portion of a laser light sensor;

receiving the reflected laser light and calculating a distance based on the information of the received laser light;

and optionally capturing a 2D image of the object to be gauged by using a camera having photosensitive pixels of an imaging portion; wherein:

the laser light beam is emitted in form of a laser beam of oval or line-like cross-section;

the distance calculation is based on the information at least of activated photosensitive pixels of the detecting portion;

wherein the photosensitive pixels of the detecting portion are configured to be activated by receiving reflected laser light of said emitted laser light beam of oval or line-like cross-section with an intensity above a predetermined threshold, and wherein the photosensitive pixels of the detecting portion and photosensitive pixels of the imaging portion are distributed in a mixed way over a photosensitive area.

12. The Method according to claim 11, wherein one average distance is calculated using the information of at least the active pixels of the detecting portion.

13. The Method according to claim 11, wherein several average distances are calculated by dividing the pixels of the detecting portion into groups and determining the peak location intensity for one, a few or all of these groups.

14. The Method according to claim 11, wherein pixel distances are calculated for a selected number of at least the active pixels of the detecting portion arranged in a predetermined way and/or for every pixel of at least the active pixels of the detecting portion.

15. The Method according to claim 11, wherein:
a lateral displacement of the detecting portion to the object to be gauged is created while the reflected laser light received by the detecting portion is integrated, so that an intentional motion blur is generated, wherein preferably the displacement has a first displacement velocity wherein said first displacement velocity is greater than the displacement velocity in the other two room axes of a Cartesian System, and wherein the first room direction is parallel±30 degrees to the triangulation baseline or orthogonal±30 degrees to the length of the cross-section of the oval or line-like laser beam.

16. The Method according to claim 11, wherein during the intentional motion blur the laser intensity is modulated in a way that a temporal windowing function results, which temporal window function together with the lateral displacement causes a spatial windowing function.

17. The Method according to claim 16, wherein the temporal windowing function is one out of a box windowing function, a triangular windowing function or a smooth windowing function.

18. Measuring machine according to claim 1, wherein
the pixels of the imaging portion and the pixels of the detecting portion are mixed over the whole photosensitive area of the camera with an equal distribution, wherein the pixels of the detecting portion are sensitive only for the wavelength of the laser light, and the pixels of the imaging portion are sensitive at least for some of the wavelengths emitted by illuminations, but not sensitive for the wavelength of the laser light.

19. The Method according to claim 11,
the pixels of the imaging portion and the pixels of the detecting portion are mixed over the whole photosensitive area with an equal distribution, wherein the pixels of the detecting portion are sensitive only for the wavelength of the laser light, and the pixels of the imaging portion are sensitive at least for some of the wavelengths emitted by illuminations, but not sensitive for the wavelength of the laser light.

* * * * *